Patented Mar. 6, 1934

1,950,320

UNITED STATES PATENT OFFICE 1,950,320

PROCESS FOR THE MANUFACTURE OF HIGH-PERCENTAGE PER COMPOUNDS

Josef Müller, Weissenstein above the Drau, Austria

No Drawing. Application December 10, 1932, Serial No. 646,739. In Austria May 10, 1932

19 Claims. (Cl. 23—50)

It has already been proposed to obtain directly in the solid form compounds containing active oxygen by allowing an aqueous hydrogen peroxide solution to act upon salts (such as borax, sodium phosphates or sodium sulphate, magnesium sulphate, alum and the like) which are free from water of crystallization, the hydrogen peroxide solution being taken up in place of the water of crystallization. In order to obtain percarbonates having a high content of active oxygen, it has later been proposed to start from a carbonate that had only lost a part of its water of crystallization, or to employ a mixture of anhydrous soda and powdered soda crystals. In this way, a pasty mass is produced, which is then freed from the mother liquor by suction, pressing or the like, or its dried in a vacuum or a stream of dry air without removal of the mother liquor by suction. It was assumed that the water of the hydrogen peroxide solution dissolves a part of the carbonate mixture, and that the formation of the new oxygen-containing product takes place in this solution, the dissolved carbonate having a salting-out action on the per compound, until the end state is attained in which there is much percarbonate with little carbonate present in the solid form, and a little percarbonate with much carbonate in solution. Even by this method, the desired degree of stability has not been attained. By the addition of the known protective substances (stabilizes) to the finished preparation, or by the usual method of carrying out the reaction in the presence of such substances, the stability on storage is indeed increased, but still not to a sufficient degree. In addition, in the manufacture of compounds from oxides or carbonates, the aqueous solutions of which have an alkaline reaction and hence in themselves have already a decomposing action on hydrogen peroxide, the oxygen yield leaves much to be desired. In particular, highly concentrated compounds of this type can only be manufactured with considerable loss of oxygen.

The invention solves the problem of the manufacture of solid high-percentage peroxides and per salts, which are capable of storage for an almost unlimited time, with a very satisfactory and to some extent almost quantitative oxygen yield. The question as to what extent it is a matter of real per compounds or hydrogen peroxide addition products may be left undecided. The process goes back to the original method and differs from the later proposal in starting fundamentally with salts which are free from water of crystallization, the latter being treated with such a restricted quantity of hydrogen peroxide solution that practically dry mixtures are produced directly. Then, preferably without a pause, at all events before the liquid is fully bound, the water content of the dry compounds is reduced still further by careful drying in a vacuum, by the action of a stream of cold or hot air, or the like. In the same way, according to the invention, high-percentage peroxides are obtained by the action of aqueous hydrogen peroxide solution upon dry metallic oxides.

It has been found that, in this way, from the salts obtained dry or rather, from the mixtures which are produced directly in the solid form, the water absorbed can be subsequently expelled, at least for the greater part, without loss of oxygen so that it is thus possible with the ordinary hydrogen peroxide solutions of commerce to attain concentrations which heretofore could not be attained at all or could only be attained with considerable loss of oxygen. This is more particularly the case also for the percarbonates, sodium peroxide, calcium peroxide and magnesium peroxide. From the known processes for the manufacture of perphosphates, which result in high-percentage products with low oxygen losses, the present process differs in its simplicity and economy.

A further general advantage of the process is that the purity of the starting substances does not play any particular part in the process, whereas otherwise very small quantities of catalytically active substances (more particularly metallic oxides), which are present in the starting materials as unavoidable accompanying substances, lead to losses due to catalytic decomposition of the hydrogen peroxide. It has therefore been proposed to remove such catalysts completely from the reaction solutions before the reaction is carried out. In contradistinction thereto, the high reaction yields of the present process are attained by using commercial starting substances without any further purification.

A compulsory condition for success is that a moist mixture should not be formed, even temporarily, that is to say, on bringing the hydrogen peroxide solution and the solid substances together, there should not be any accumulation of liquid at any place which would result in hydrolytic decomposition. The suitably measured quantity of the hydrogen peroxide solution running in must therefore be distributed at once quite uniformly in the solid substance.

The stability of the products thus formed, which in itself is already very great, may be increased in known manner by the addition of stabilizers. These protective substances may be added either to the hydrogen peroxide solution or may be incorporated in the form of solid substances with the oxides or salts to be converted. The protective substances may also be introduced partly in the solid substance and partly in the hydrogen peroxide solution, so that mixing only takes place during the reaction, or they may be produced during the reaction itself from suitable substances added to each of the two participants in the reaction. Stabilizers which may be added to one of the two components or to both components are, for example, pyrophosphoric acid, pyrophosphates, water glass, protalbic acid, gum arabic, sodium chloride, boric acid, and tin chloride. For the purpose of interaction, the following pairs of reagents may be employed for example, the first-named component to be added to the solid substance and the second to the liquid: magnesium chloride-water glass, stannate-sulphuric acid, stannate-phosphoric acid, stannate-hydrofluoric acid, tin fluoride-phosphoric acid.

It has furthermore been found that products of the highest concentration may be manufactured advantageously according to this process by treating one and the same portion of solid starting substance with additional portions of hydrogen peroxide solution in several partial processes in succession one after the other, the reaction product of the preceding partial process being each time before continuing the treatment freed from water to such an extent that it is capable of taking up further quantities of hydrogen peroxide. In this further development of the original process, a compulsory condition for success is again that, on bringing the hydrogen peroxide solution and the solid substances together there should not be any accumulation of liquid, which would result in hydrolytic decomposition, at any place. If necessary, the concentration of the product thus obtained is finally increased still further by careful removal of water.

In some cases, it is preferable to add to the previously treated mixed product, before or after the addition of hydrogen peroxide solution, or simultaneously with the latter, also fresh portions of the solid starting substance, if necessary together with additional quantities of stabilizers.

Furthermore, it has been found that it is advantageous to allow the hydrogen peroxide solution to act in the atomized form upon the metallic oxides or salts, or upon the previously treated mixed product, thereby ensuring the regular production of absolutely uniform products. For this purpose, for example (after the manner of the Humphries process of improving flour), the solid substance may be allowed to fall as fine material through a sieve to which is imparted a shaking movement in the horizontal plane, and a very finely divided spray or mist of hydrogen peroxide solution may be introduced into the falling material. It is most expedient to inject both the solid substance and the hydrogen peroxide solution (for example, by means of spraying nozzles) into a reaction chamber, so that the reaction components meet in this chamber in a finely divided condition. In these forms of carrying out the process, a portion of the water is expelled even during the reaction, so that products with a high content of active oxygen are obtained directly. If a cold stream of air is employed for spraying, the said stream also acts simultaneously as a cooling agent during the reaction. According to the nature of the reaction products, however, it may also be expedient to employ heated air even during the reaction, in order thereby to increase the effect of the air in removing water. In connection with the method of carrying out the process in two or more partial processes following in succession one after the other, the advantage is sometimes thereby obtained that special drying of the reaction products, before the addition of further quantities of hydrogen peroxide, may be omitted. By subsequent careful drying of the mixed products, for example spray drying or cylinder drying, the concentration and stability of the product may finally be increased still further in this case also.

Finally, it has been found that the process is also very advantageously applicable, with all the improvements hereinbefore described, to the manufacture of organic per salts and per compounds, such as for instance combinations with hydrogen peroxide of urea, acetamide, urethane, succinamide, asparagine, mannite, eryrithrite, pinacol, betaine.

*Examples*

1. 10 kilograms of calcined soda, previously mixed with 200 grams of magnesium chloride, are treated with 6½ litres of a 40 per cent. aqueous hydrogen peroxide solution containing in addition 5 per cent of water glass, with brisk agitation, the hydrogen peroxide solution being added in a slow stream so that the hydrogen peroxide is taken up by the salt in proportion as it is added, and so that there is only a slight evolution of heat. A product with about 13 per cent. of $H_2O_2$ is obtained, the oxygen yield being 98.75 per cent. The compound, which is obtained in a practically dry state, is sent immediately after mixing, through a hot air or cold air drier, whereby a solid product with 24 per cent. $H_2O_2$, corresponding to 86.2 per cent. $Na_2CO_4$ is obtained, the oxygen yield being 95 per cent.

2. 1 kilogram of burnt lime is carefully mixed with 500 cubic centimetres of a 30 per cent. aqueous hydrogen peroxide solution (containing 2 per cent. of boric acid), the said solution being added gradually. A dry reaction product with an $H_2O_2$—content of about 10 per cent. is obtained. The oxygen yield is 80 per cent. After passage through a hot or cold air drier, the $H_2O_2$ content rises to 12 per cent., corresponding to 25.45 per cent. $CaO_2$, with a yield of 75 per cent.

3. 1 kilogram of magnesium oxide is treated with 1,000 cubic centimetres of a 30-per cent. aqueous hydrogen peroxide solution (containing 2 per cent. of phosphoric acid), the flow being carefully regulated, to form a dry reaction product which is produced with a content of 13 per cent. of $H_2O_2$ in a yield of 93 per cent. By drying in a current of air, the content of hydrogen peroxide increases to 17 per cent., corresponding to 28.15 per cent. of $MgO_2$, with an oxygen yield of 90 per cent.

4. 20 kilograms of calcined soda, previously mixed with 300 grams of magnesium chloride and 200 grams of common salt, are treated with 14 litres of a 40-per cent. hydrogen peroxide solution. Both the mixture of the solid soda with the said salt additions, and the hydrogen peroxide solution are injected into an air vessel by compressed air atomizers. During the reaction, 1,000 cubic centimetres of a water glass solution are added simultaneously with the hydrogen peroxide solution. A dry reaction product with about 17 per cent. of $H_2O_2$ is obtained directly, the oxygen yield amounting to 98.5 per cent. On treating this mixed product further in tunnel driers or Bühler apparatus with heated compressed air, an end product is obtained with 24 per cent. of $H_2O_2$, corresponding to 86.2 per cent. $Na_2CO_4$, the oxygen yield amounting to 96 per cent. for the entire process.

5. 10 kilograms of granulated anhydrous sodium pyrophosphate, previously mixed with 10 grams of tin fluoride, are treated, as described in the fourth example, in an air vessel with 4 litres of a 50-per cent. hydrogen peroxide solution containing 1 per cent. of phosphoric acid. A dry product with about 14 per cent. of $H_2O_2$ is obtained directly with a 100 per cent. oxygen yield. On further treatment with hot air the concentration rises to 20 per cent. of $H_2O_2$ with a total yield of 98 per cent.

6. 20 kilograms of calcined soda, previously mixed with 700 grams of magnesium chloride, are treated with 12½ litres of a 40-per cent. hydrogen peroxide solution containing 5 per cent. of water glass. The reaction may be carried out in the manner of the Humphries process. The product thus obtained is dried for example in a tunnel drier or a steam drier of the type of the Bühler rapid drier, with heated air (about 35° C.). A reaction product with 17 per cent. of $H_2O_2$ is obtained, with an oxygen yield of 99 per cent. This product, after the addition of a mixture of 1 kilogram of calcined soda with 20 grams of stannic acid, is then treated again without a break in the same apparatus with 12½ litres of a 40-per cent. hydrogen peroxide solution. After drying, an end product with 28 per cent. of $H_2O_2$ is obtained, the oxygen yield amounting to 97 per cent. The percarbonate manufactured in this way does not exhibit any decomposition after storage for two months.

7. 10 kilograms of urea are treated with 3 litres of a 70-per cent. hydrogen peroxide solution. After drying, a product with 17 per cent. of $H_2O_2$ in a 100-per cent. yield is obtained. On further treatment with 3 litres of 70-per cent. hydrogen peroxide solution, a product with about 34 per cent. of $H_2O_2$ in a 98-per cent. yield is obtained after drying. Alcohol and organic acids are employed as stabilizers, whereby the alcohol is added, for example, to the hydrogen peroxide solution, and solid organic acids may be mixed with the urea.

I wish to be understood that I use the term "dry" in the following claims to qualify substances as being more or less dry (air-dry) without having been purposely dried, and, in connection with crystalized substances, to define the property of being free from water of crystallization.

What I claim is:—

1. A process for the manufacture of per compounds which comprises acting upon a solid starting material capable of combining with hydrogen peroxide with such a restricted quantity of an aqueous hydrogen peroxide solution and in such a uniform manner that a moist mixture is not even temporarily produced, and thereupon reducing still further the water content of the product thus obtained by careful drying before the liquid is fully bound.

2. A process for the manufacture of per compounds which comprises acting upon a dry metallic oxide with such a restricted quantity of an aqueous hydrogen peroxide solution and in such a uniform manner that a moist mixture is not even temporarily produced, and thereupon reducing still further the water content of the product thus obtained before the liquid is fully bound.

3. A process for the manufacture of per compounds which comprises acting upon a salt substantially free from water of crystallization with such a restricted quantity of an aqueous hydrogen peroxide solution and in such a uniform manner that a moist mixture is not even temporarily produced, and thereupon reducing still further the water content of the product thus obtained before the liquid is fully bound.

4. A process for the manufacture of per compounds which comprises acting upon a solid organic compound having the capacity of combining with hydrogen peroxide with such a restricted quantity of an aqueous hydrogen peroxide solution and in such a uniform manner that a moist mixture is not even temporarily produced, and thereupon reducing still further the water content of the product thus obtained before the liquid is fully bound.

5. A process of the general character defined in claim 1, wherein commercial starting substances are used without further purification.

6. A process for the manufacture of per compounds which comprises distributing in a solid compound capable of combining with hydrogen peroxide and being substantially dry, an aqueous hydrogen peroxide solution so uniformly as to avoid any accumulation of liquid, the said hydrogen peroxide solution being added in such a restricted quantity that compounds containing active oxygen are obtained directly in the solid form, thereupon reducing the water content of the so obtained product still further and hence increasing its content of active oxygen and stability before the liquid is fully bound.

7. A process for the manufacture of per compounds which comprises acting upon a solid starting material capable of combining with hydrogen peroxide and being substantially dry, with such a restricted quantity of an aqueous hydrogen peroxide solution as to obtain compounds containing active oxygen directly in the solid form, the hydrogen peroxide solution being allowed to act in the atomized form upon the solid starting material, and thereupon reducing still further the water content of the product thus obtained.

8. A process for the manufacture of per compounds which comprises causing an aqueous hydrogen peroxide solution to act upon a solid compound having the capacity of combining with hydrogen peroxides and being substantially dry, the said hydrogen peroxide solution being uniformly added in such a restricted quantity that compounds containing active oxygen are obtained directly in the solid form, and thereupon still further reducing the water content of the so obtained product before the liquid is fully bound.

9. A process for the manufacture of per compounds which comprises causing an aqueous hydrogen peroxide solution to act upon a solid compound having the capacity of combining with peroxides and being capable of taking up a hydrogen peroxide solution in place of water of crystallization, the said hydrogen peroxide solution being uniformly added in such a restricted quantity that compounds containing active oxygen are obtained directly in the solid form, and thereupon still further reducing the water content of the so obtained product and hence increasing its content of active oxygen and stability before the liquid is fully bound.

10. A process for the manufacture of per compounds which comprises causing an aqueous hydrogen peroxide solution to act upon a solid compound having the capacity of combining with hydrogen peroxides and being substantially dry, the said hydrogen peroxide solution being uniformly added in such a restricted quantity that compounds containing active oxygen are obtained directly in the solid form, and thereupon still further reducing, by drying in a vacuum, the water content of the so obtained product before the liquid is fully bound.

11. A process for the manufacture of per compounds which comprises causing an aqueous hydrogen peroxide solution to act upon a solid compound having the capacity of combining with hydrogen peroxides and being substantially dry, the said hydrogen peroxide solution being uniformly added in such a restricted quantity that compounds containing active oxygen are obtained directly in the solid form, and thereupon still further reducing the water content of the so obtained product by removal of water in a stream of gas before the liquid is fully bound.

12. A process for the manufacture of per compounds which comprises treating a solid starting material capable of combining with hydrogen peroxide with such a restricted quantity of an aqueous hydrogen peroxide solution and in such a uniform manner that a moist mixture is not even temporarily produced, and thereupon reducing further the water content of the product thus obtained by careful drying in the presence of a stabilizer.

13. A process of the general character defined in claim 10 wherein a stabilizer is added to one of the starting materials.

14. A process of the general character defined in claim 10 wherein a stabilizer is added to both the solid and the liquid starting material.

15. A process of the general character defined in claim 10 wherein a stabilizer is formed during reaction from substances added to each of the two components participating in the reaction.

16. A process for the manufacture of per compounds which comprises incorporating a solid starting material capable of combining with hydrogen peroxide with such a restricted quantity of an aqueous hydrogen peroxide solution and in such a uniform manner that a moist mixture is not even temporarily produced, while treating one and the same portion of the solid starting substance in a plurality of partial processes following in succession one after the other, the reaction product of the preceding partial process being each time before continuing with the treatment, freed from water to such an extent that it is capable of taking up further quantities of hydrogen peroxide.

17. A process of the general character defined in claim 16 wherein the hydrogen peroxide solution is allowed to act in the atomized form upon the solid material.

18. A process of the general character defined in claim 16 wherein both the hydrogen peroxide solution and the solid substances are injected into a reaction chamber in order to meet and react therein in a finely divided form.

19. A process for the manufacture of per compounds which comprises incorporating a solid starting material capable of combining with hydrogen peroxide and being substantially dry, with such a restricted quantity of an aqueous hydrogen peroxide solution and in such a uniform manner that a moist mixture is not even temporarily produced, while treating one and the same portion of the solid starting substance in a plurality of partial processes following in succession one after the other, the reaction product of the preceding partial process being each time before continuing with the treatment, freed from water to such an extent that it is capable of taking up further quantities of hydrogen peroxide; then increasing the concentration of the end product thus obtained still further by careful removal of water.

JOSEF MÜLLER.